Aug. 19, 1958 C. H. EWING 2,848,172
FOOD WASTE DISPOSER
Filed July 14, 1954 2 Sheets-Sheet 2
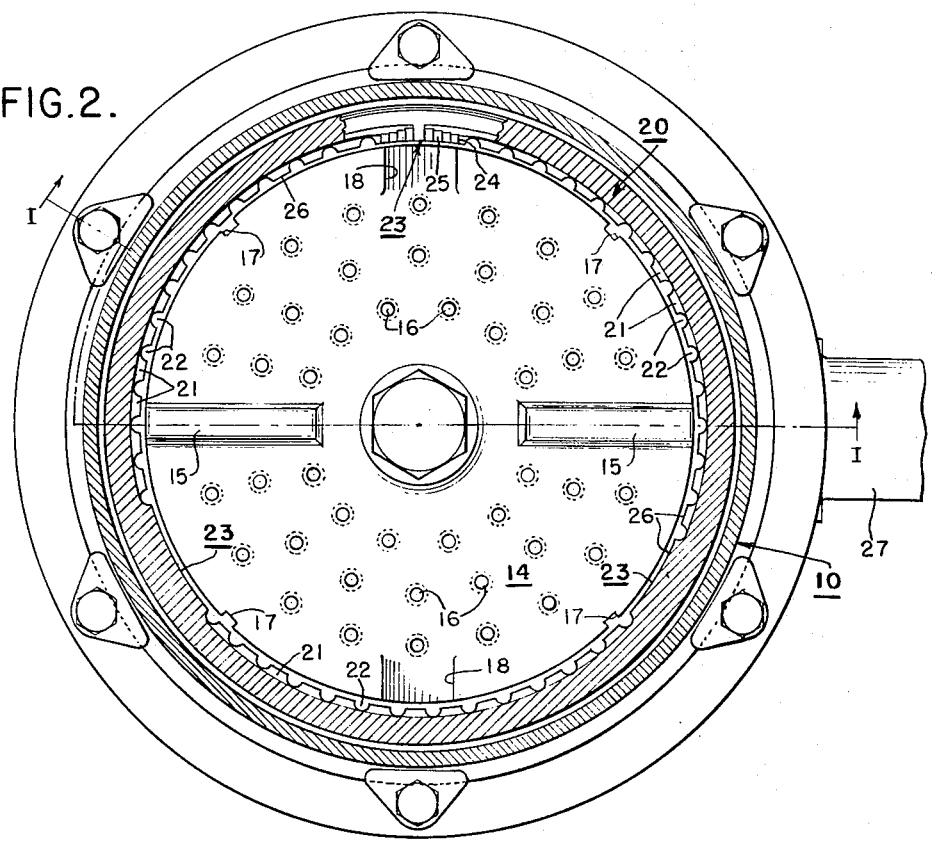
FIG. 2.
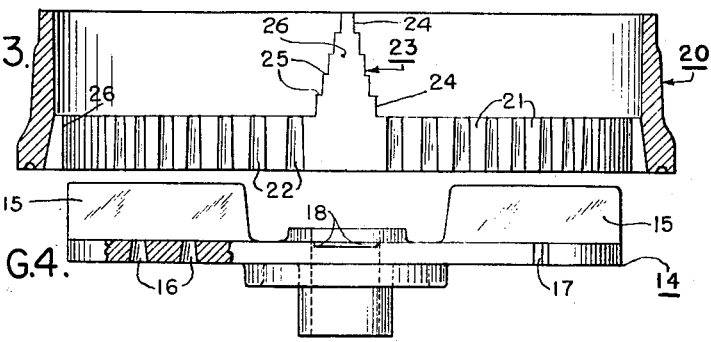
FIG. 3.
FIG. 4.
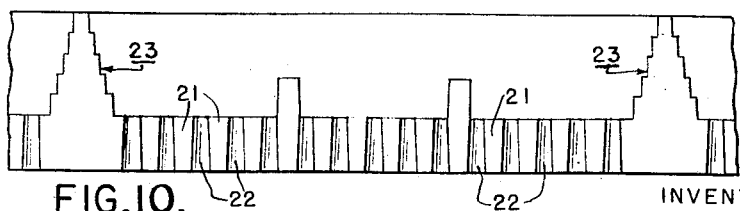
FIG. 10.
INVENTOR
CLIFTON H. EWING
BY R. J. Eisinger
ATTORNEY

United States Patent Office 2,848,172
Patented Aug. 19, 1958

2,848,172

FOOD WASTE DISPOSER

Clifton H. Ewing, Westhampton, Mass., assignor to Westinghouse Electric Corporation, East Pittsburgh, Pa., a corporation of Pennsylvania Application July 14, 1954, Serial No. 443,354

4 Claims. (Cl. 241—257)

My invention relates to a food waste disposer in which food waste is ground into fine particles to be carried by a stream of water into waste pipes.

An object of my invention is to provide an improved disposer.

Another object is to provide a disposer that may be manufactured at lower cost.

Another object is to provide a disposer that grinds the food waste into smaller particles than heretofore, so as to assure that they will be carried by the water through the waste pipes, thereby greatly reducing the possibility of clogging the pipes.

These and other objects are effected by the invention as will be apparent from the following description taken in connection with the accompanying drawings, forming a part of this application, in which:

Fig. 2 is a horizontal section, taken on line II—II of Fig. 1;

Fig. 3 is a vertical section of the shredder;

Fig. 4 is an elevation, partly in section, of the rotor or impeller;

Fig. 5 is a fragmentary perspective view of the shredder;

Fig. 6 is a fragmentary bottom plan view of the shredder;

Fig. 7 is a fragmentary vertical section on a larger scale;

Fig. 8 is a sectional view similar to Fig. 7 but taken adjacent to and showing the side of one of the projections of the shredder;

Fig. 9 is a fragmentary vertical section showing a modification of the rotor or impeller; and Fig. 10 is a partial developed elevation of the shredder showing a modification.

Figure 1:
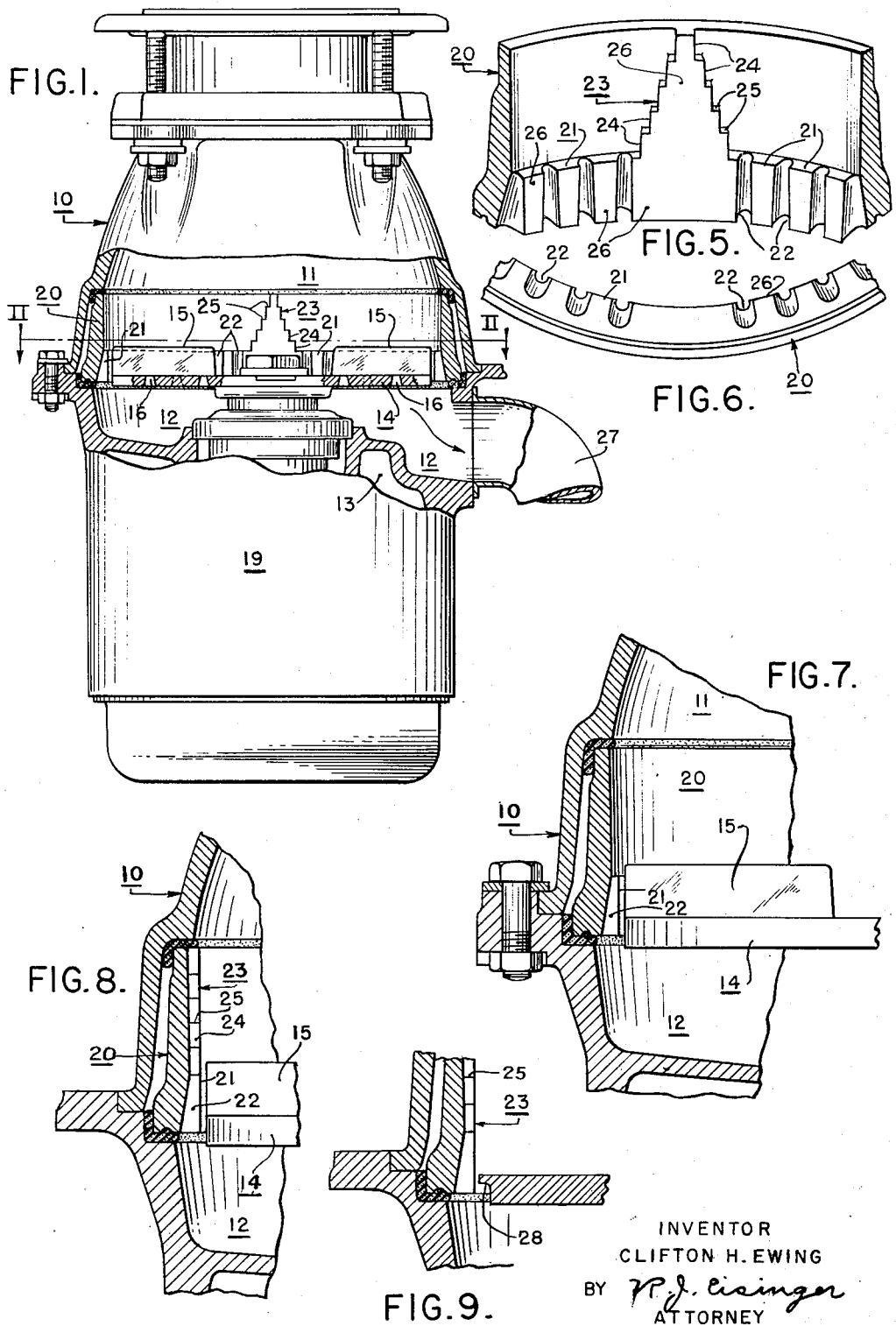
Fig. 1 is an elevational view, with parts in section, of a food waste disposer incorporating my invention.

Referring to the drawings in detail, and first to Fig. 1, the food waste disposer comprises a casing 10 which provides a grinding or shredding chamber 11, a discharge chamber 12 and a motor chamber 13. These chambers, as well as the disposer in general, are generally circular in horizontal section.

A disc-like rotor or impeller 14, often referred to as a flywheel, is disposed horizontally to form a partition between the grinding chamber and the discharge chamber, more particularly to form the bottom of the grinding chamber. The rotor 14 is formed with two integral impelling vanes 15, sometimes referred to as impellers, extending radially and upwardly from its top surface. The outer ends of these vanes are machined on the same diameter as the periphery of the rotor. The rotor is also formed with a plurality of openings 16, which serve principally to permit flow of water therethrough when the motor is not energized. The openings are of increasing diameter from top to bottom to minimize the possibility of clogging thereof. The rotor may be formed with slots 17 in the periphery to improve the comminuting action on fibrous material, such as corn husks. It may also be formed with inclined slots 18 in the top adjacent the periphery. The rotor is mounted on the upper end of the vertical shaft of the motor 19 in the chamber 13. The motor is preferably operable to drive the rotor in either direction of rotation.

The casing is provided with an annular liner or wall portion 20, commonly referred to as a shredder, which encircles the lower portion of the grinding or shredding chamber 11 and also the top surface of the rotor. The shredder is of generally cylindrical or tubular form, and is formed by casting. On its inner surface adjacent its lower edge, it is provided with an annular series of teeth 21 which are spaced from each other by slots 22 formed therebetween. In a preferred commercial embodiment, the teeth 21 are $9/16$ inch high and the slots are $3/16$ inch wide. The shredder is also formed with a suitable number, preferably three, of projections 23 disposed approximately equidistantly around the circumference. Each of these projections extends upwardly from the row of teeth. One of the principal characteristics of the present invention is that the side of the projection 23 which faces circumferentially toward the oncoming impelling vane, that is, the side facing oppositely of the direction of rotation, is formed with a surface or surfaces which face horizontally or upwardly but not downwardly. If the rotor is operable in either direction of rotation, as is preferred, the two opposite sides of each projection 23 are so formed. In the preferred illustrated embodiment, each side has a stepped configuration, comprising vertical surfaces 24 which face horizontally and horizontal surfaces 25 which face upwardly. The side as a whole, however, is inclined upwardly at an angle to the horizontal.

The inner surfaces 26, that is, the surfaces facing radially inwardly, of the teeth 21 and the projections 23 are disposed on a common radius; that is, they are all disposed on a cylinder concentric with the axis of rotation of the disposer. This form facilitates grinding these surfaces, which may be done after the shredder has been heat-treated. Grinding permits these surfaces to be accurately formed. Also, it forms sharp edges and corners that grind or shred the food waste.

In the illustrated embodiment, the slots 22 are semi-circular at the top and are substantially tangent with the circle at the back of the teeth. The width of these slots increases slightly from top to bottom while the depth increases more substantially from top to bottom as shown on the drawings. This facilitates casting and more particularly it minimizes the possibility of particles clogging the slots.

In the illustrated embodiment, there are no slots 22 under the projections 23, thereby producing a wider tooth at this point which could be considered a part of the projection 23, particularly since it has a common or continuous surface 26 therewith.

The rotor or impeller 14 is disposed at least partly within the shredder 20, for example, with its top surface about $5/32$ inch above the bottom of the teeth 21. It is disposed relative to the shredder so that there is a small radial clearance therebetween. This relation has the advantage that the clearance does not change upon variation in the vertical position of the rotor. Thus, it is possible to maintain much closer clearance between the periphery of the rotor and the inner surface of the teeth 21 than is possible with a previous construction in common use in which the clearance is at an angle to radial and is, therefore, materially affected by change in vertical position of the rotor. In the illustrated embodiment, the impelling vanes 15 are $5/8$ inch high and extend above the top of the teeth 21.

The discharge chamber 12 has an outlet connected to a fitting 27, which is adapted to be connected to suitable waste pipes, such as an ordinary sewer system.

OPERATION

The food waste to be comminuted and disposed of is inserted in the grinding chamber 11 through the inlet opening in the top thereof. Flow of a stream of water into the chamber through said inlet is also established. The motor is then energized.

Upon being rotated by the motor, the rotor, through its impelling vanes 15, rotates the food waste resting upon it. The food waste is at the same time subjected to centrifugal force tending to impel the same radially outwardly. Thus, it is thrown against the sharp cutting edges of the teeth 21 and the projections 23 which grate or shred particles therefrom. Those particles that are sufficiently small to pass through the slots 22 are carried therethrough by the stream of water.

The larger particles that are unable to pass through the slots 22 continue to be thrown around the shredding chamber and against the cutting edges, so that small particles are continuously cut or shred therefrom, until the material is completely reduced to such small particles as are carried away through the slots 22. The water and the particles carried thereby flow by gravity through the slots 22, the discharge chamber 12 and the fitting 27, into the waste or sewer pipes.

It will be noted that the projections 23 do not have any surfaces that face downwardly or in any direction having a downward component. This has the important advantage that the waste particles are not driven downwardly into the strainer slots and the clearance between the periphery of the rotor and the surface of the shredder, as in previous constructions. Thus, the particles remain longer in the grinding chamber and are reduced to smaller particles which are readily carried through the slots 22.

It will be noted that the food particles, on leaving the grinding cavity, must turn practically a right angle to drop into the discharge chamber beneath the rotor.

It has been found that the construction of the disposer shown and described effectively reduces all of the food waste to such fine particles. This has the important advantage that such fine particles are readily carried through the waste or sewer pipes into which they are discharged from the disposer, and clogging of such pipes is substantially eliminated.

Fig. 9

In Fig. 9 I show a modification in which the periphery of the rotor is relieved at 28 for a distance below the top thereof. The advantage of this arrangement is to reduce the possibility of clogging or jamming between the periphery and the teeth 21.

Fig. 10

If desired, some of the teeth 21 may be extended upwardly above adjacent teeth. For example, there may be two such extended teeth between each pair of projections 23, as shown in Fig. 10. The sharp corners of the projecting portions of these teeth are more prominent and, therefore, more effective in cutting waste material.

While the invention has been shown in several forms, it will be obvious to those skilled in the art that it is not so limited, but is susceptible of various other changes and modifications without departing from the spirit thereof.

What is claimed is:

1. A food waste disposer comprising a casing having a grinding chamber therein, a disc-like rotor forming a bottom wall for said chamber and rotatable about a vertical axis, said rotor having an impelling vane on the top thereof, said disposer having a wall portion of circular horizontal section encircling the lower portion of said chamber and the top surface of said rotor, said wall portion having an annular row of teeth projecting radially inwardly from its inner surface and disposed with close radial clearance between the radially inner surfaces of the teeth and the periphery of the rotor, said wall portion also having a projection on said inner surface extending upwardly from said row of teeth, said projection having on one side a plurality of surfaces facing in a direction or directions having a greater horizontal component than upward component and a plurality of intervening surfaces facing in a direction or directions having greater upward component than horizontal component, and said projection on said one side having substantially no surface facing in a direction having a downward component, said rotor being operable in the direction of rotation to impel particles against said one side of said projection, whereby said particles are thrown about in various directions, particularly horizontally and upwardly rather than downwardly.

2. A food waste disposer comprising a casing having a grinding chamber therein, a disc-like rotor forming a bottom wall for said chamber and rotatable about a vertical axis, said rotor having an impelling vane on the top thereof, said disposer having a wall portion of circular horizontal section encircling the lower portion of said chamber and the top surface of said rotor, said wall portion having an annular row of teeth projecting radially inwardly from its inner surface and disposed with close radial clearance between the radially inner surfaces of the teeth and the periphery of the rotor, said wall portion also having a projection on said inner surface extending upwardly from said row of teeth, one side of said projection being of stepped configuration having horizontally-facing and upwardly-facing surfaces and having substantially no surface facing in a direction having a downward component, so that said side as a whole faces in a direction inclined upwardly, said rotor being operable in the direction of rotation to impel particles against said one side of said projection, whereby said particles are thrown about in various directions, particularly horizontally and upwardly rather than downwardly.

3. A disposer as set forth in claim 1 wherein the radially inner surfaces of said teeth and said projection are ground to a common radius from the axis of rotation.

4. A food waste disposer comprising a casing having a grinding chamber therein, a disc-like rotor forming a bottom wall for said chamber and rotatable about a vertical axis, said rotor having an impelling vane on the top thereof, said disposer having a wall portion of circular horizontal section encircling the lower portion of said chamber and the top surface of said rotor, said wall portion having a projection on said inner surface extending upwardly from said rotor, one side of said projection being of stepped configuration having horizontally-facing and upwardly-facing surfaces, said side as a whole facing in a direction inclined upwardly, said rotor being operable in the direction of rotation to impel particles against said one side of said projection, whereby said particles are thrown about in various directions, particularly horizontally and upwardly rather than downwardly.

References Cited in the file of this patent
UNITED STATES PATENTS

| | | |
|---|---|---|
| 2,482,124 | Powers | Sept. 20, 1949 |
| 2,656,985 | Backlund et al. | Oct. 27, 1953 |
| 2,669,395 | Swisher | Feb. 16, 1954 |
| 2,682,376 | Frank | June 29, 1954 |